United States Patent
Veltman et al.

(10) Patent No.: US 8,259,799 B2
(45) Date of Patent: Sep. 4, 2012

(54) ENCODING DEVICE, ENCODING METHOD, DECODING DEVICE, AND DECODING METHOD

(75) Inventors: Hendrikus Markus Veltman, Tokyo (JP); Yoichi Yagasaki, Tokyo (JP); Teruhiko Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 1097 days.

(21) Appl. No.: 10/519,840

(22) PCT Filed: Jul. 18, 2003

(86) PCT No.: PCT/JP03/09138
§ 371 (c)(1),
(2), (4) Date: Jul. 1, 2005

(87) PCT Pub. No.: WO2004/010707
PCT Pub. Date: Jan. 29, 2004

(65) Prior Publication Data
US 2005/0238099 A1    Oct. 27, 2005

(30) Foreign Application Priority Data

Jul. 19, 2002 (JP) .................. 2002-211829
Jul. 17, 2003 (JP) .................. 2003-276326

(51) Int. Cl.
*H04N 7/12* (2006.01)

(52) U.S. Cl. .............. 375/240.12; 375/240.25

(58) Field of Classification Search ............. 375/240.25, 375/240.15
See application file for complete search history.

(56) References Cited

U.S. PATENT DOCUMENTS

| | | | | |
|---|---|---|---|---|
| 5,127,000 A | * | 6/1992 | Henrion | 370/394 |
| 6,285,405 B1 | * | 9/2001 | Binford et al. | 348/512 |
| 6,504,576 B2 | * | 1/2003 | Kato | 348/423.1 |
| 6,654,421 B2 | * | 11/2003 | Hanamura et al. | 375/240.26 |
| 6,795,498 B1 | * | 9/2004 | Kato et al. | 375/240.01 |
| 7,706,445 B2 | * | 4/2010 | Okada | 375/240.15 |
| 2001/0001023 A1 | | 5/2001 | Imahashi et al. | |
| 2002/0012399 A1 | | 1/2002 | Nishi et al. | |

FOREIGN PATENT DOCUMENTS

| EP | 1 195 996 A2 | | 4/2002 |
|---|---|---|---|
| JP | 8-18953 | | 1/1996 |
| JP | 08-149464 | * | 6/1996 |

(Continued)

OTHER PUBLICATIONS

Fujiwara, Hiroshi, "Saishin MPEG Kyokasho", Ascii Corp., pp. 236-237, Aug. 1, 1994.

(Continued)

*Primary Examiner* — Jay Patel
*Assistant Examiner* — Jessica Prince
(74) *Attorney, Agent, or Firm* — Oblon, Spivak, McClelland, Maier & Neustadt, L.L.P.

(57) ABSTRACT

Continuous reproduction can be made possible. An encoding apparatus for executing an encoding process with an encoding system capable of at least B-pictures as pictures to be prediction-encoded comprises a timing calculation means for, anticipating that a plurality of encoded information created by performing the encoding process will be sequentially decoded on a decoding side, calculating output timing for results of decoding the encoded information, and a timing notification means for notifying the decoding side of the output timing calculated by the timing calculation means before a result of decoding corresponding encoded information is obtained.

8 Claims, 9 Drawing Sheets

FOREIGN PATENT DOCUMENTS

| | | | |
|---|---|---|---|
| JP | 8-149464 | | 6/1996 |
| JP | 8149464 | * | 6/1996 |
| JP | 8-205146 | | 8/1996 |
| JP | 09-009258 | * | 1/1997 |
| JP | 9-9258 | | 1/1997 |
| JP | 9-37249 | | 2/1997 |
| JP | 09-247670 | * | 9/1997 |
| JP | 9-247670 | | 9/1997 |
| JP | 9247670 | * | 9/1997 |
| JP | 99258 | * | 1/1999 |
| JP | 11-122113 | | 4/1999 |
| JP | 2000-69477 | | 3/2000 |
| JP | 2000-228768 | | 8/2000 |
| JP | 2000-350183 | | 12/2000 |
| JP | 2001-238110 | | 8/2001 |
| JP | 2002-91424 | | 3/2002 |
| JP | 2004-56232 | | 2/2004 |
| JP | 2004-180266 | | 6/2004 |
| WO | WO 01/89227 A1 | | 11/2001 |

OTHER PUBLICATIONS

Supplementary European Search Report, dated Nov. 30, 2010.
European Office Action dated Mar. 22, 2012, in corresponding patent application 03 765 323.5.

* cited by examiner

| t | 0 | 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 |
|---|---|---|---|---|---|----|----|----|----|----|----|----|----|----|----|----|----|----|----|----|----|----|----|----|
| EI | I00 | B01 | B02 | B03 | P04 | B05 | B06 | B07 | I08 | B09 | B10 | B11 | P12 | B13 | B14 | B15 | P16 | | | | | | | |
| EO | | | | I00 | P04 | B01 | B02 | B03 | I08 | B05 | B06 | B07 | P12 | B09 | B10 | B11 | P16 | B14 | B13 | B15 | | | | |
| Ed | | | | 6 | 0 | 8 | 8 | 8 | 0 | 8 | 8 | 8 | 0 | 8 | 8 | 8 | 0 | 6 | 10 | 8 | | | | |
| Dd | | | | 4 | 10 | 2 | 2 | 2 | 10 | 2 | 2 | 2 | 10 | 2 | 2 | 2 | 10 | 4 | 0 | 2 | | | | |
| DO | | | | | | I00 | B01 | B02 | B03 | P04 | B05 | B06 | B07 | I08 | B09 | B10 | B11 | P12 | B13 | B14 | B15 | | | |

| t | EI | EO | Ed | Sud | Dd | DO |
|---|---|---|---|---|---|---|
| 0 | I00 | | | | | |
| 2 | P01 | | | | | |
| 4 | P02 | | | | | |
| 6 | P03 | I00 | | 6 | 0 | I00 |
| 8 | P04 | P01 | | 6 | 2 | I00 |
| 10 | P05 | P02 | | 6 | 2 | P01 |
| 12 | P06 | P03 | | 6 | 2 | P02 |
| 14 | P07 | P04 | | 6 | 2 | P03 |
| 16 | P08 | P05 | | 6 | 2 | P04 |
| 18 | P09 | P06 | | 6 | 4 | P05 |
| 20 | P10 | P07 | | 6 | 4 | P05 |
| 22 | P11 | P08 | | 6 | 4 | P06 |
| 24 | P12 | P09 | | 6 | 4 | P07 |
| 26 | B13 | P10 | | 6 | 4 | P08 |
| 28 | B14 | P11 | | 6 | 6 | P09 |
| 30 | B15 | B12 | | 6 | 6 | P10 |
| 32 | P16 | B16 | 0 | 0 | 12 | P10 |
| 34 | | B15 | 4 | 8 | 8 | P11 |
| 36 | | B14 | 8 | 4 | 4 | P12 |
| 38 | | B13 | 12 | 0 | 0 | B13 |
| 40 | | | | | | B14 |
| 42 | | | | | | B15 |
| 44 | | | | | | P16 |
| 46 | | | | | | |

ENCODING DEVICE, ENCODING METHOD, DECODING DEVICE, AND DECODING METHOD

TECHNICAL FIELD

This invention relates to an encoding apparatus, encoding method, decoding apparatus and decoding apparatus, and for example, is suitably applied for transmitting image information (hereinafter, referred to as successive image information) composed of a plurality of unit image information being continued, via a network medium such as satellite broadcasting, cable TV or the Internet, or for processing successive image information on a storage medium such as an optical disc, a magnetic disk or a flash memory.

BACKGROUND ART

Recently, for broadcasting stations and homes, such devices have been spread that adopt an encoding system such as MPEG (Moving Picture Experts Group) to encode (compress) successive images through orthogonal transformation such as discrete cosine transform, and motion compensation, utilizing the redundancy of the successive image information, for efficient information transmission or storage, by taking the successive images as digital information.

Especially, the MPEG2 (ISO/IEC 13818-2) encoding system is defined as a general image encoding system, and is widely used as an application for professionals and for consumers since it can treat interlaced images and progressively scanned images, and standard resolution images and high resolution images. By using this MPEG2 encoding system, high encoding efficiency (compression rate) and high quality of images can be provided, for example, by assigning interlaced images of standard resolution of 720×480 pixels an amount of encoding (bit-rate) of 4 to 8 [Mbps], or by assigning progressively scanned images of high resolution of 1920× 1088 pixels a bit rate of 18 to 22 [Mbps].

The MPEG2 encoding system is mainly used for encoding high quality of images for broadcasting and does not cope with an amount of encoding (bit rate) lower than that used by the MPEG1 encoding system, that is, an encoding method with high encoding efficiency. It was expected that popularization of mobile terminals brings high needs of such an encoding system, and therefore the MPEG4 encoding system was standardized. The MPEG4 encoding system for images was approved as international standard ISO/IEC 14496-2 in December 1998.

In addition, recently, an encoding system (hereinafter referred to as JTV encoding system) called MPEG4AVC or H.264 was standardized by a joint video team composed of a VCEG group and an MPEG group. Compared with the MPEG2 and the MPEG4, this JVT encoding system can provide higher encoding efficiency although it requires more operations for encoding and decoding.

Now, FIG. 8 shows a rough construction of an encoding apparatus which realizes an encoding process with any of the encoding systems referred above. As shown in FIG. 8, the encoding apparatus 100 is composed of an image rearrangement buffer 102, an adder 103, an orthogonal transformation unit 104, a quantization unit 105, a reverse encoding unit 106, a storage buffer 107, a dequantization unit 108, an inverse orthogonal transformation unit 109, a frame memory 110, a motion prediction/compensation unit 111 and a rate control unit 112.

In this case, the encoding apparatus 100 stores successive image information in the image rearrangement buffer 102 to rearrange the successive image information according to GOP (Group of Pictures) structure on a unit-image-information basis (frame by frame or field by field).

The image rearrangement buffer 102 gives the orthogonal transformation unit 104 unit image information out of the successive image information, which should be intra-prediction-encoded. The orthogonal transformation unit 104 applies orthogonal transformation such as the discrete cosine transform or the Karhunen Loeve transform, to the unit image information and gives an obtained orthogonal transformation coefficient to the quantization unit 105.

The quantization unit 105 performs a quantization process on the orthogonal transformation coefficient given from the orthogonal transformation unit 104, under the control of the rate control unit 112, and supplies obtained quantized information (a quantized orthogonal transformation coefficient) to the reverse encoding unit 106 and the dequantization unit 108. The reverse encoding unit 106 applies variable-length coding or reverse encoding such as arithmetic coding to the quantized information, and stores obtained encoded information (encoded quantized-information) in the storage buffer 107.

The dequantization unit 108 applies a dequantization process to the quantized information and supplies obtained orthogonal transformation coefficient to the inverse orthogonal transformation unit 109. The inverse orthogonal transformation unit 109 applies the inverse orthogonal transformation to the orthogonal transformation coefficient and stores, if necessary, obtained unit image information in the frame memory 110 as reference image information.

On the other hand, the image rearrangement buffer 102 supplies unit image information which should be inter-prediction-encoded, out of the successive image information to the motion prediction/compensation unit 111. The motion prediction/compensation unit 111 performs a motion prediction/compensation process by using the unit image information and reference image information read from the frame memory 10, and supplies obtained predicted image information to the adder 103. The adder 103 supplies to the orthogonal transformation unit 104 difference between the predicted image information and corresponding unit image information as differential information.

This differential information is subjected to various processes, as in the case of the intra-encoding, and the resultant is stored in the storage buffer 107 as encoded information and is stored, if necessary, in the frame memory 110 as reference image information.

In addition, the motion compensation/prediction unit 111 gives the reverse encoding unit 106 motion vector information which is obtained together with the predicted image information as a result of the motion prediction/compensation process. The reverse encoding unit 106 performs the reverse encoding process on the motion vector information to thereby obtain encoded motion vector information for the header part of the corresponding encoded information.

In such a manner, the encoding apparatus 100 successively creates encoded information on a unit-image-information basis by performing the encoding process on the successive image information, and successively outputs the encoded information via the storage buffer 107.

Next, FIG. 9 shows a rough construction of a decoding apparatus which performs a decoding process corresponding to the encoding system of the encoding apparatus 100. As shown in FIG. 9, the decoding apparatus 120 is composed of a storage buffer 121, a reverse decoding unit 122, a dequantization unit 123, an inverse orthogonal transformation unit 124, an adder 125, an image rearragement buffer 126, a motion prediction/compensation unit 127, and a frame memory 128.

In this case, the decoding apparatus 120 temporarily stores encoded information which is successively inputted, in the storage buffer 121 and then supplies it to the reverse decoding unit 122. In a case where the encoded information have been subjected to the intra-prediction encoding, the reverse decoding unit 122 applies a decoding process, variable-length decoding or arithmetic decoding, to the encoded information, and supplies obtained quantized information to the dequantization unit 123.

The dequantization unit 123 applies a dequantization process to the quantized information given from the reverse decoding unit 122 and supplies obtained orthogonal transformation coefficient to the inverse orthogonal transformation unit 124. The inverse orthogonal transformation unit 124 applies an inverse orthogonal transformation process to the orthogonal transformation coefficient to thereby create the original image information before the encoding process (hereinafter, referred-to as restored image information), and stores this in the image rearrangement buffer 126.

On the other hand, in a case where the encoded information have been subjected to the inter prediction encoding, the reverse decoding unit 122 performs a decoding process on both of this encoded information and the encoded motion vector information which has been inserted in the header part of the encoded information, and supplies obtained quantized information to the dequantization unit 123 and supplies the motion vector information to the motion prediction/compensation unit 127. The quantized information is subjected to various processes, as in the case of decoding encoded information intra-encoded, and is then supplied to the adder 125 as differential information.

In addition, the motion prediction/compensation unit 127 creates predicted image information based on the motion vector information and reference image information stored in the frame memory 128, and supplies this to the adder 125. The adder 125 synthesizes the reference image information and the differential information, and stores obtained restored image information to the image rearrangement buffer 126.

In the aforementioned manner, the decoding apparatus 120 successively creates restored image information by performing the decoding process on the encoded information successively inputted, and successively outputs the restored image information via the image rearrangement buffer 126 to, for example, a display unit (not shows) for successive reproduction.

By the way, since the MPEG2 encoding system prescribes that only I (Intra)-pictures and P (Predictive)-pictures are used as pictures for inter-prediction-encoding, a decoding order for the decoding process is naturally determined.

Therefore, in a case where the decoding apparatus 120 successively reproduces restored image information which is created by performing the decoding process on encoded information with the MPEG 2 encoding system, it can appropriately display images based on the restored image information on the display unit without adjusting the output timing of the restored image information at the image rearrangement buffer 126.

On the other hand, as compared with the MPEG2 encoding system, the JVT encoding system has a larger degree of freedom for selection of pictures for prediction-encoding, for example, it can treat not only I-and P-pictures but also B (Bidirectional)-pictures as pictures for inter-prediction-encoding.

However, the JVT encoding system does not prescribe a decoding order in a decoding process and further does not specify output timing of restored image information.

Therefore, if the decoding apparatus 120 successively reproduces restored image information which is created by performing the decoding process on encoded information with the JVT encoding system, such happening occurs that encoded information is still being decoded at the output timing for restored image information corresponding to the encoded information due to a limited resource of the image rearrangement buffer 126, and as a result, the continuousness is broken.

DISCLOSURE OF THE INVENTION

This invention was made in view of the above points and intends to an encoding apparatus and encoding method for making a decoding apparatus perform successive reproduction, and to a decoding apparatus capable of performing successive reproduction and a decoding method.

To solve such problems, in this invention, an encoding apparatus which carries out an encoding process with an encoding system capable of treating at least B-pictures as pictures to be prediction-encoded comprises a timing calculation means for calculating output timing of results of decoding a plurality of encoded information, anticipating that the encoded information created through the encoding process will be successively decoded on a decoding side, and a timing notification means for notifies the decoding side of each of the output timing calculated by the timing calculation means before a result of decoding corresponding encoded information is obtained.

Therefore, the encoding apparatus of this invention can make the decoding side recognize output timing calculated assuming that encoded information will be decoded on the decoding side, so as to keep the output continuousness of restored image information even the encoded information have been subjected to encoding with an encoding system which does not allow a decoding order to be naturally determined, thus the decoding side can perform continuous reproduction.

Further, in an encoding method for performing an encoding process with an encoding system capable of treating at least B-pictures as pictures to be prediction-encoded, it is anticipated that a plurality of encoded information created by performing the encoding process will be successively decoded on a decoding side, and output timing of results of decoding the encoded information are calculated and the decoding side is notified of the calculated output timing before a result of decoding corresponding encoded information is obtained.

Therefore, in the encoding method according to this invention, by making the decoding side recognize output timing calculated anticipating that encoded information will be decoded on the decoding side, the output continuousness of restored image information can be kept even the encoded information have been subjected to encoding with an encoding system which does not allow a decoding order to be naturally determined, thus the decoding side can perform continuous reproduction.

Still further, a decoding apparatus for performing a decoding process on a plurality of encoded information which have been subjected to encoding with an encoding system capable of treating at least B-pictures as pictures to be prediction-encoded comprises a storage means for temporarily storing restored image. information successively created as a result of the decoding process, and an output control means for controlling output of the restored image information to be stored in the storage means. If restored image information to be stored in the storage means is failed, the output control means re-outputs restored image information outputted just before the failure.

Therefore, the decoding apparatus of this invention can keep the output continuousness of restored image information even encoded information have been subjected to encoding with an encoding system which does not allow a decoding order to be naturally determined, and thus can perform continuous reproduction.

Still further, in this invention, a decoding method for performing a decoding process on a plurality of encoded information which have been subjected to encoding with an encoding system capable of at least B-pictures as pictures to be prediction-encoded comprises a first step of temporarily storing restored image information sequentially created as a result of the decoding process, a second step of outputting the restored image information to be stored, and a third step of, in a case where restored image information to be stored has been failed, re-outputting restored image information outputted just before the failure.

Therefore, in the decoding method of this invention, even encoded information have been subjected to encoding with an encoding system which does not allow a decoding order to be naturally determined, the output continuousness of restored image information can be kept, thus continuous reproduction can be performed.

DETAILED DESCRIPTION OF THE DRAWINGS

FIG. 3 is a table used for explaining calculation of output timing.

FIG. 6 is a table used for explaining control of re-output.

BEST MODE FOR CARRYING OUT THE INVENTION

Embodiment 1
(1) Construction of Image Reproduction System 1

Figure 1:
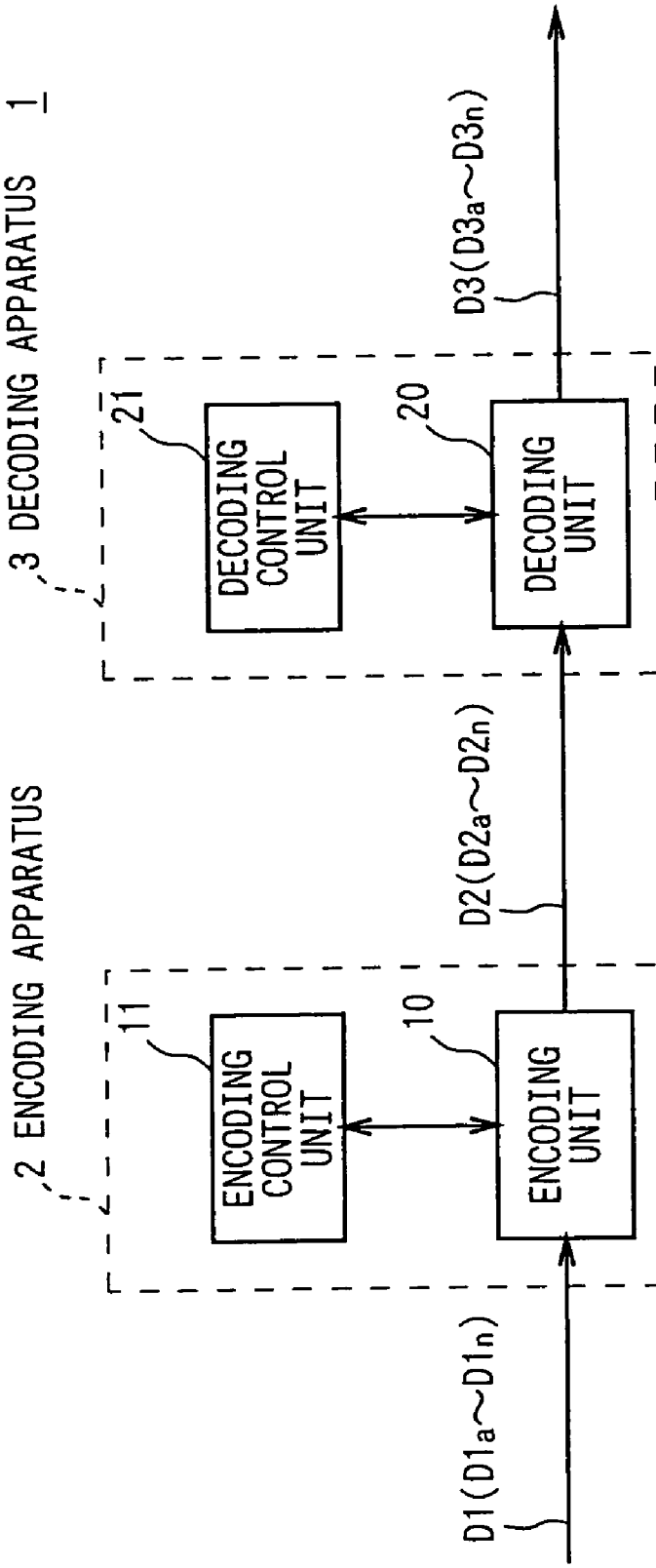
FIG. 1 is a block diagram showing an image reproduction system according to the first embodiment.

Referring to FIG. 1, reference numeral 1 shows an image reproduction system according to the first embodiment as a whole, which is constructed by connecting an encoding apparatus 2 with the JVT encoding system and a decoding apparatus 3 to each other with a prescribed transmission line.

Figure 8:
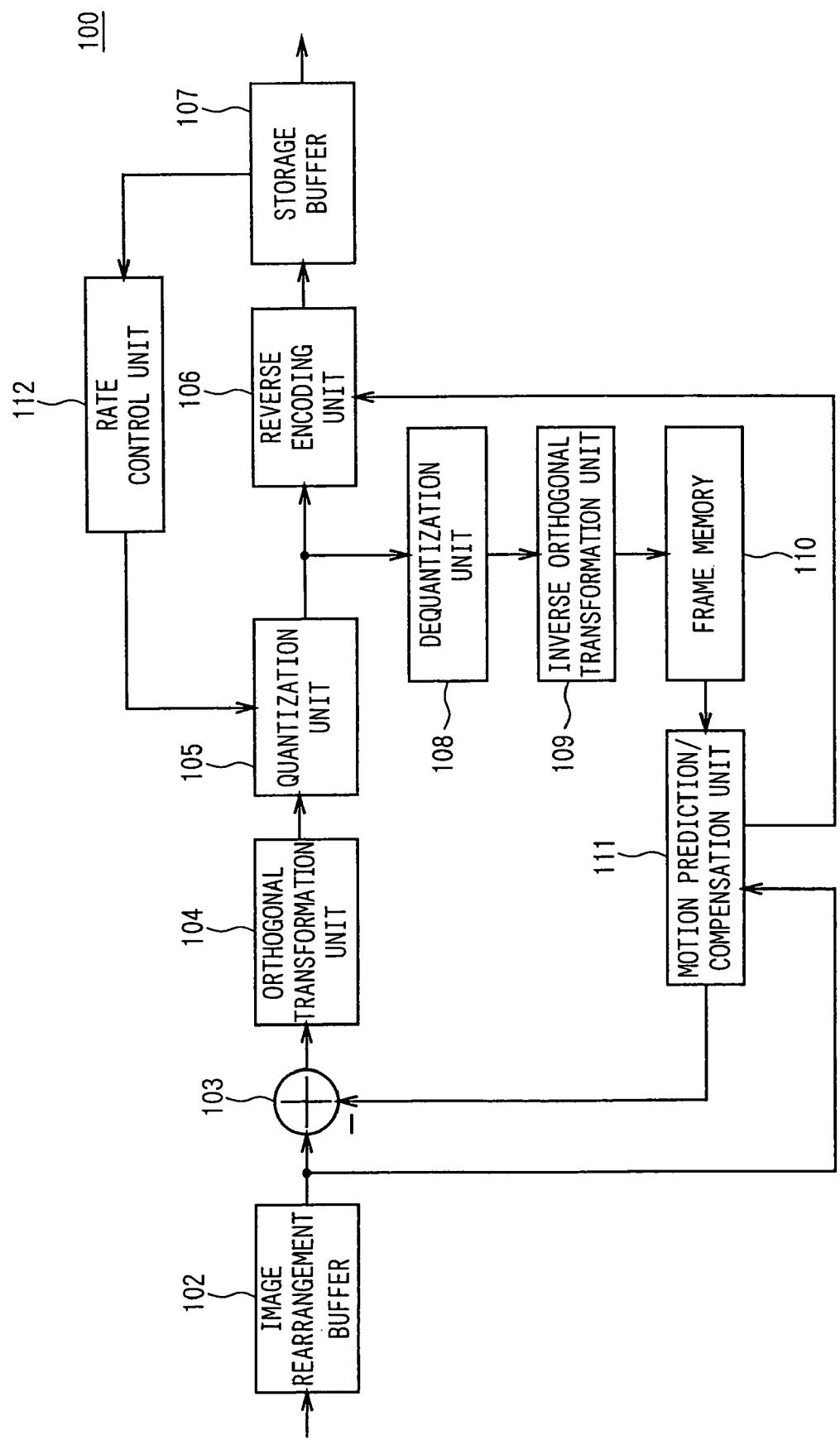
FIG. 8 is a block diagram showing the construction of an encoding apparatus.

The encoding apparatus 2 includes an encoding unit 10 having the same construction as the encoding apparatus 100 described with reference to FIG. 8 and an encoding control unit 11 for controlling the encoding unit 10, and similarly to the case described with reference to FIG. 8, performs an encoding process on successive image information D1 through the encoding unit 10 controlled by the encoding control unit 11 to successively create encoded information D2 (D2$a$, D2$b$, ... or D2$n$) from unit image information (frame data or field data) D1$a$ to D1$n$, and then outputs the encoded information D2, the successive image information D1 being supplied from the outside or being read from an internal recording medium (not shown) such as an HDD (Hard Disk Drive).

Figure 9:
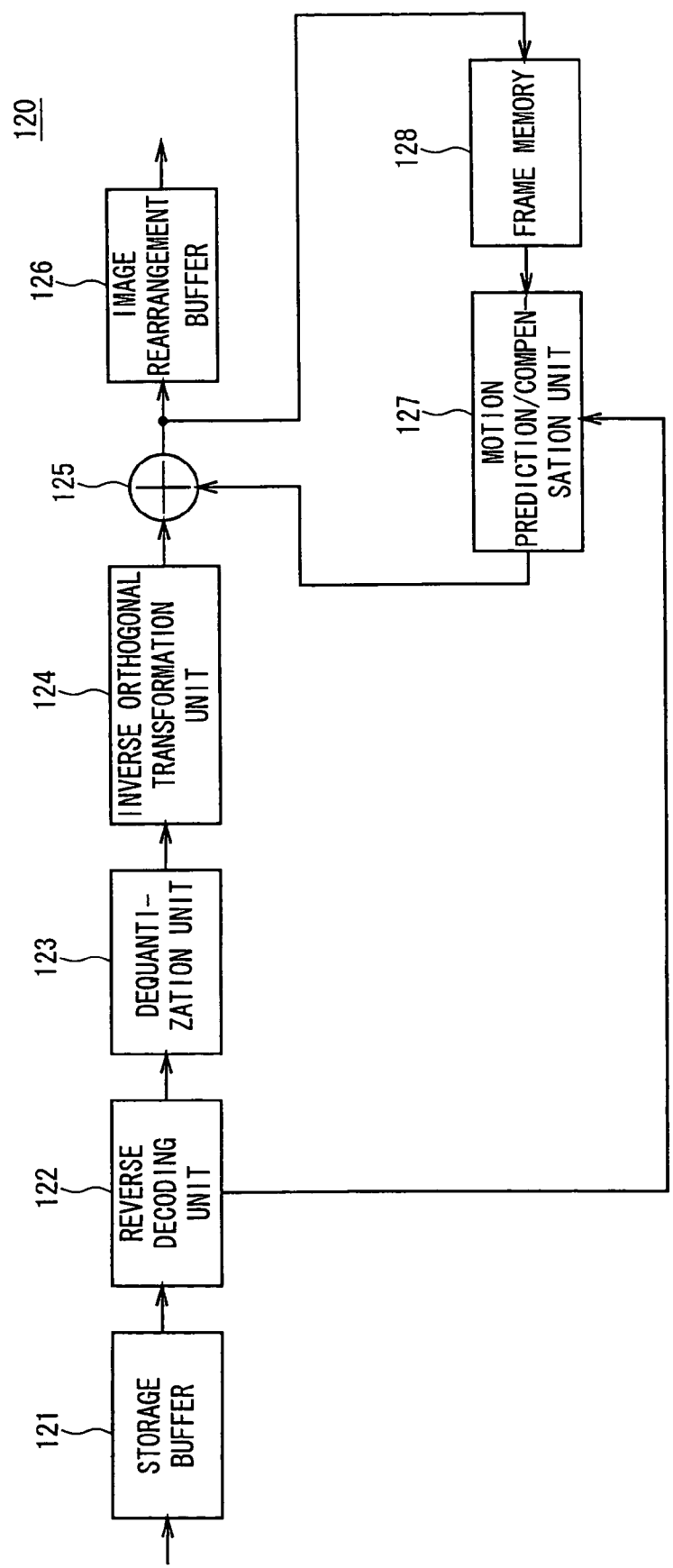
FIG. 9 is a block diagram showing the construction of a decoding apparatus.

The decoding apparatus 3, on the other hand, includes a decoding unit 20 having the same construction as the decoding apparatus 120 described with reference to FIG. 9 and a decoding control unit 21 for controlling the decoding unit 20, and similarly to the case described with reference to FIG. 9, performs a decoding process on the encoded information D2 successively inputted through the transmission line, through the decoding unit 20 controlled by the decoding control unit 21 to successively create restored image information D3 (D3$a$, D3$b$, ... or D3$n$), and then successively outputs the restored image information D3 to a display unit (not shown), which results in continuous reproduction.

(2) Construction of Encoding Control Unit 11

This encoding control unit 11 of the encoding apparatus 2 detects the GOP structure of the successive image information D1 inputted to the encoding unit 10 and conditions on an encoding process, such as an encoding order, (hereinafter, referred to as encoding conditions), based on previously stored programs, table information and so on with the JVT encoding system, to control the encoding unit 10 on the encoding conditions.

In addition to the above structure, the encoding control unit 11 calculates output timing of the restored image information D3 which is a result of decoding the encoded information D2, anticipating that the encoded information D2 will be successively decoded on a decoding side (decoding apparatus 3), and performs an output timing notification process to notify the decoding apparatus 3 of this output timing before the restored image information D3 is created.

Figure 2:
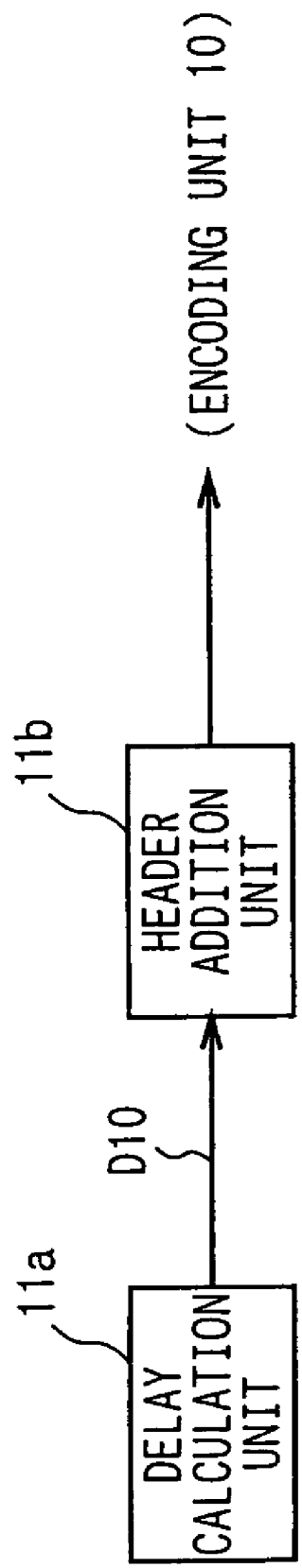
FIG. 2 is a functional block diagram showing the processing contents of an encoding control unit.

Now, if the processing contents of the output timing notification processing by the encoding control unit 11 is divided functionally, they can be divided into a delay calculation unit 11$a$ for calculating a period of time after a decoding process of the encoded information D2 is started until the decoded image information D3 created by the process is outputted (hereinafter, the period of time is referred to as decode delay), and a header addition unit 11$b$ for adding a decode delay as the header of corresponding encoded information D2, as shown in FIG. 2. Processes by the delay calculation unit 11$a$ and the header addition unit will be described by using an example shown in FIG. 3.

Referring to FIG. 3, a column "EI (Encoder Input)" shows picture types which are assigned to unit image information D1$a$ to D1$n$ to be inputted to the encoding unit 10, according to the GOP structure, that is, a picture-type order before the encoding process. A column "EO (Encoder Output)" shows the picture types of the encoded information D2$a$ to D2$n$ created by performing the encoding process on the unit image information D1$a$ to D1$n$ inputted to the encoding unit 10 in a prescribed encoding order, that is, a picture-type order after the encoding process.

A column "Ed (Encoder Delay)" shows a period of time after the encoding process of unit image information D1$a$, D1$b$, ... or D1$n$ is started until the encoded information D2 created by the process is outputted (hereinafter, this period of time is referred to as an encode delay) and the period of time is calculated based on the encoding conditions. Based on encode delays (in a column "Ed"), output timing of the encoded information D2$a$ to D2$n$ (in a column "EO") are adjusted if necessary. Specifically, as to the first unit image information D1$a$ ("I00" in the column "EI") which is of an I-picture type, for example, if a period of time after it is inputted (t=0) until it is converted into the encoded information D2a ("I00" in the column "EO") is shorter than a corresponding encode delay (six seconds in the column "Ed"), its output timing is adjusted by storage in the storage buffer 107 (FIG. 8) of the encoding unit 10 and the information is outputted when the encode delay is passed (t=6).

The delay calculation unit 11a calculates decode delays (in a column "Dd (Decoder Delay)") for the encoded information D2 based on the encode delays, and calculates the decode delays of the encoded information D2a to D2n so that a decode delay of encoded information D2 ("B13") having the longest encode delay (10 seconds) is the shortest (0 second).

Specifically, since the longest encode delay is 10 [seconds], the delay calculation unit 11a subtracts the value of the encode delay corresponding to each piece of encoded information D2a to D2n from 10 [seconds] to thereby calculate the values of decode delays (values in the column "Dd") for the encoded information D2a to D2n.

Then, the delay calculation unit 11a creates decode delay information D10 from thus calculated decode delays and sends them to the header addition unit 11b.

Every time when the encoding unit 10 creates encoded information D2, the header addition unit 11b adds, based on the decode delay information D10 supplied from the delay calculation unit 11a, a corresponding decode delay to the encoded information D2 by placing the delay in the header.

In this case, for example, the encoded information D2a ("I00" in the column "EO") having such a decode delay added as the header is outputted when the encode delay is passed and is inputted into the decoding apparatus 3 through the transmission line. Note that, in FIG. 3, the transmission time through the transmission line between the encoding apparatus 2 and the decoding apparatus 3 is not considered, and therefore the input timing of encoded information D2 to the decoding-apparatus 3 is taken as the same as the output timing (in the column "EO") of the encoded information D2 from the encoding apparatus 10.

The decoding apparatus 3 adjusts the output timing of restored image information D3 which is a result of decoding encoded information D2, based on the decode delays of the encoded information D2. That is, the decode delay (4 [seconds] in the column "Dd") of the first encoded information D2a, for example, is recognized by the decoding control unit 21 of the decoding apparatus 3 based-on the header added to the encoded information D2a before the encoded information D2a is decoded. Then, the encoded information D2a is converted into restored image information D3a by the decoding unit 20, and if a passage time from the input (t=6) is shorter than the corresponding encode delay (4 [seconds]), its output timing is adjusted by storage in the image rearrangement buffer 126 (FIG. 9) according to necessity, and the restored image information D3a is outputted when the decode delay (4 [seconds] (t=10)) is passed, to be displayed on the display unit.

In addition, as to the other encoded information D2b to D2n, similar to the encoded information D2a, they are converted into the restored image information D3b to D3n by the decoding unit 20, and these restored image information D3b to D3n are rearranged, if necessary, by the image rearrangement buffer 126 (FIG. 9) to have the same picture-type order before the encoding process (in a column "DO (Decoder Output)"), and are outputted after the output timing are adjusted based on corresponding encode delays, which results in continuous reproduction.

The encode control unit 11 performs the output timing notification process as described above, to thereby make the decoding apparatus 3 recognize decode delays via headers, the decode delays calculated assuming that encoded information D2 will be decoded by the decoding apparatus 3.

Figure 4:
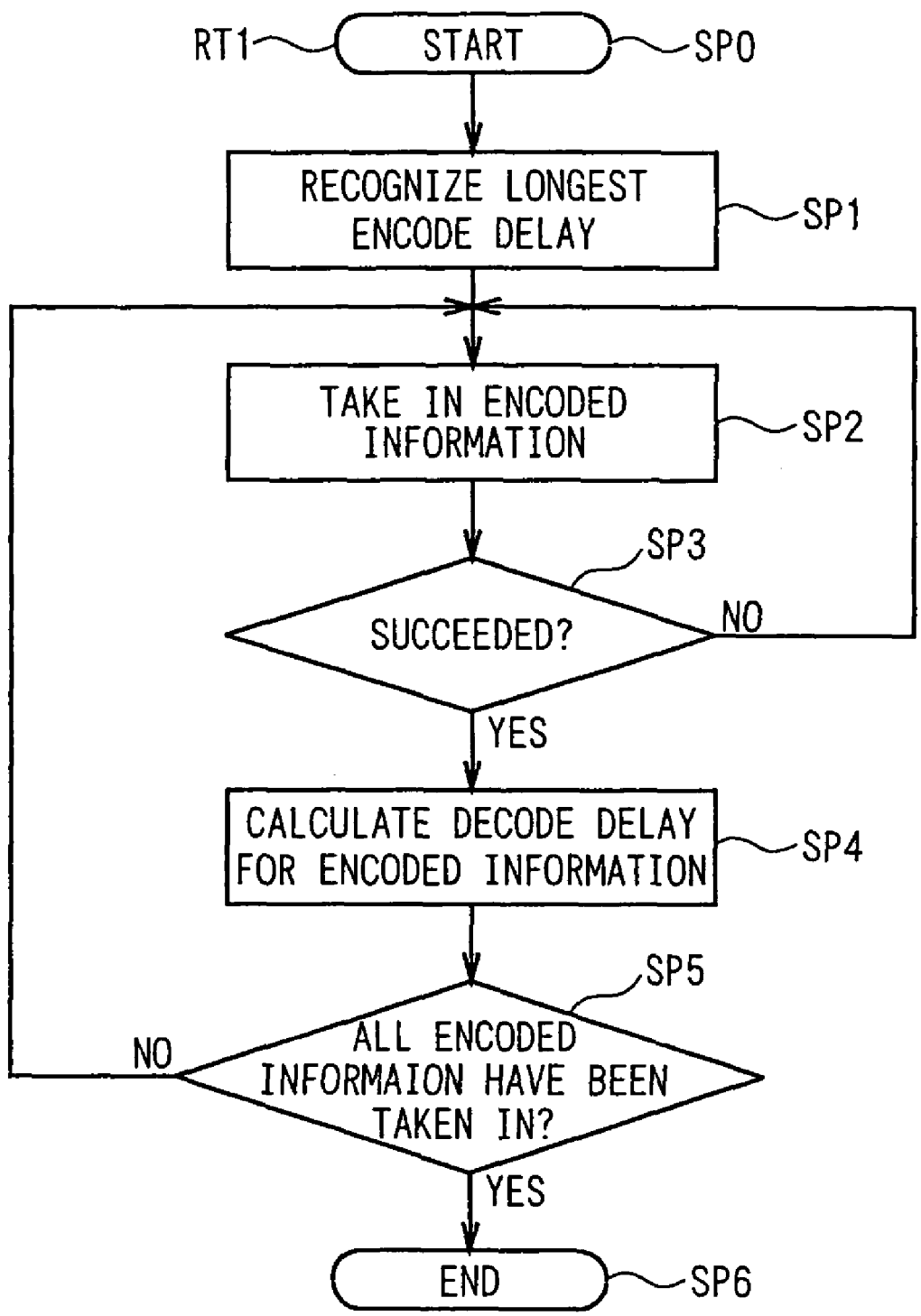
FIG. 4 is a flowchart showing a procedure for an output timing notification process.

Now, the output timing notification process as described is carried out following a procedure RT1 for the output timing notification process shown in FIG. 4.

Specifically, the encoding control unit 11 starts the procedure RT1 for the output timing notification process from step SP0 when predetermined operations to execute the encoding process are performed with an input unit (not shown), and finds out the longest encode delay (which corresponds to 10 [seconds] in the column "Ed" in FIG. 3) out of encode delays calculated on the encoding conditions at following step SP1.

Then the encoding control unit 11 stores, for example, the encoded information D2a existing-in the reverse encoding unit 106 (FIG. 8) of the encoding unit 10, in the storage buffer 107 (FIG. 8) at step SP2, and judges at step SP3 whether the storage has been done successfully, and if a negative result is obtained, the process returns back to step SP2 to re-store the encoded information D2a.

If an affirmative result is obtained at step SP2, on the contrary, the encoding control unit 11 subtracts the encode delay (which corresponds to 6 [seconds] in the column "Ed" in FIG. 3) for the encoded information D2a stored at step SP2 from the encode delay recognized at step SP1, to thereby calculate a decode delay (which corresponds to 4 [seconds] in the column "Dd") for the encoded information D2a, and adds the calculated decode delay to the encoded information D2a as a header at step SP4.

Then, the encoding control unit 11 judges at step SP5 whether all of the encoded information D2 have been taken in the storage buffer 107 (FIG. 8), and if a negative result is obtained, it returns back to step SP2 and repeats the above processes, and on the contrary, if an affirmative result is obtained, it moves on to step SP6 where the procedure RT1 for the output timing notification process is terminated.

As described above, the encoding control unit 11 can execute the output timing notification process following the procedure RT1 for the output timing notification process.

In the aforementioned construction, the encoding apparatus 2 calculates output timing (decode delay) for a result (restored image information D3) of decoding the-encoded information D2, anticipating that the encoded information D2 obtained as a result of encoding with the JVT encoding system will be decoded on the decoding apparatus 3 side, and adds the calculated output timing as a header.

Therefore, this encoding apparatus 2 can make the decoding apparatus 3 recognize via headers decode delays which are obtained assuming that the encoded information D2 will be decoded by the decoding apparatus 3, before the decoding process, so that even the encoded information D2 have been encoded with the JVT encoding system which does not allow the decoding order to be naturally determined, the output continuousness of restored image information D3 can be kept.

In this case, the encoding apparatus 2 calculates output timing (decode delays) for restored image information D3 so as to immediately output a result of decoding encoded information D2 ("B13" in FIG. 3) having the longest periods of time out of periods of time after the encoding process is started till encoded information D2 is outputted.

Therefore, the encoding apparatus 2 can calculate output timing (decode delays) for results (restored image information D3) of decoding encoded information D2 based on output timing (encode delays) from the decoding side for encoded information D2 which needs the longest time to be decoded on the decoding side, and as a result, the output timing from the decoding apparatus 3 can be adjusted (by offset) so as not to occur underflow.

According to the above construction, it is assumed that encoded information D2 obtained through encoding with the JVT encoding system will be decoded on the decoding apparatus 3 side, and output timing (decode delays) for restored image information D3 obtained by decoding the encoded information D2 are calculated and the calculated output timing are added as headers, and thereby even the encoded information D2 have been encoded with the JVT encoding system which does not allow the decoding order to be naturally determined, the output continuousness of the restored image information D3 can be kept, thus the decoding apparatus 3 can perform continuous reproduction.

(3) Other Embodiments

Note that, the aforementioned first embodiment has described the case where the JVT encoding system is applied. This invention, however, is not limited to this and another kind of encoding system which can treat at least B-pictures as pictures to be prediction-encoded can be applied.

Further, the aforementioned first embodiment has described the case where a timing calculation means for, assuming that a plurality of encoded information D2 created by performing the encoding process are sequentially decoded on a decoding side, calculating output timing for results of decoding the encoded information calculates decode delays for results of decoding the encoded information so that a result of decoding encoded information D2 having the longest encode delay out of the encode delays is immediately outputted. This invention, however, is not limited to this and a period of time after a result of decoding encoded information is obtained until its output timing may be calculated instead of the decode delays, or a decode delay for a result of decoding encoded information may be calculated based on a calculation result on an assumed occupation rate of information stored in a buffer of the decoding side. If output timing can be calculated based on such a calculation result, such output timing can be calculated as to make the decoding side perform stable continuous reproduction.

Further, the aforementioned first embodiment has described the case where a timing notification means for notifying a decoding side of output timing before a result of decoding corresponding encoded information is obtained adds output timing (decode delay) to corresponding encoded information D2 as its header based on decode delay information D10 supplied from the delay calculation unit 11a. This invention, however, is not limited to this and the decode delay information D10 can be directly outputted to the decoding side before an encoding process, without being added as a header.

Embodiment 2

(1) Construction of Image Reproduction System 51

Figure 5:
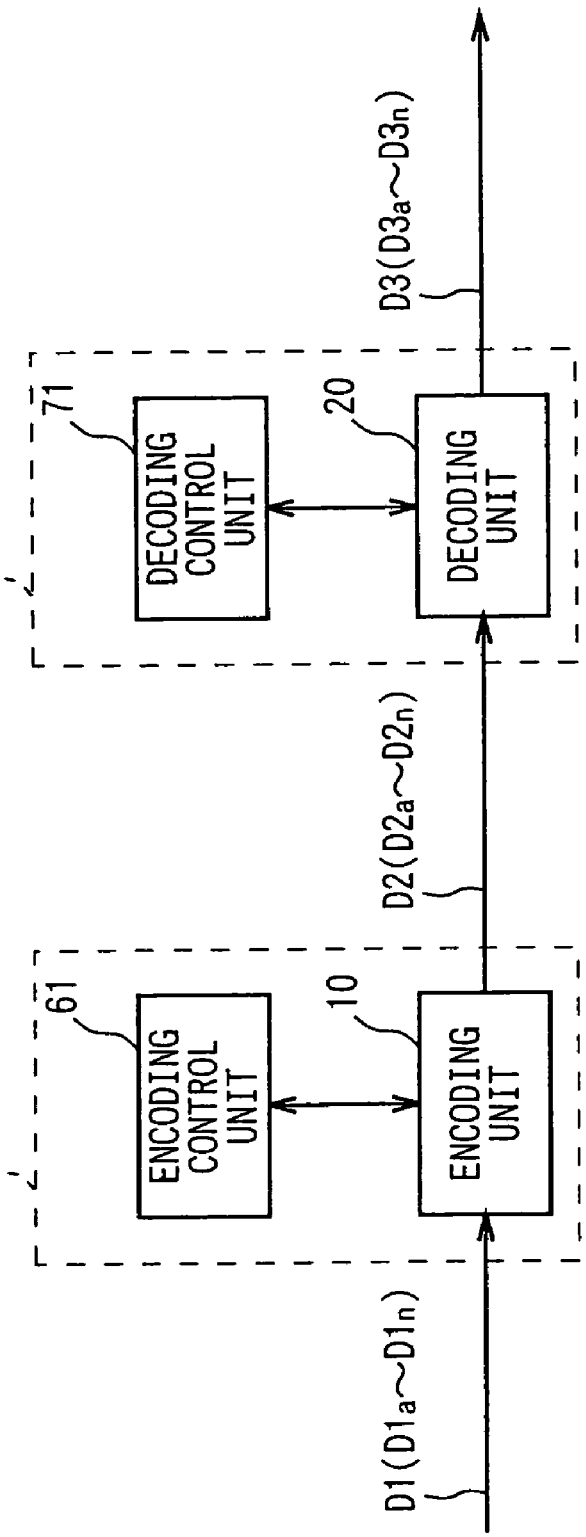
FIG. 5 is a block diagram showing an image reproduction system according to the second embodiment.

In FIG. 5 in which the same reference numerals are applied to those of corresponding parts in FIG. 1, reference numeral 51 shows an image reproduction system according to the second embodiment as a whole and the system is constructed by connecting an encoding apparatus 52 with the JVT encoding system and a decoding apparatus 53 to each other with a prescribed transmission line.

The encoding apparatus 52 has an encoding unit 10 and an encoding control unit 61 for controlling the encoding unit 10, and the encoding control unit 61 does not perform the aforementioned output timing notification process but carries out the other processes performed in the aforementioned first embodiment. In this case, the encoding apparatus 52 performs an encoding process on successive image information D1 with the encoding unit 10 controlled by the encoding control unit 61, to thereby successively create encoded information D2 without a decode delay added as a header, and then successively outputs the encoded information D2.

The decoding apparatus 53, on the other hand, has a decoding unit 20 and a decoding control unit 71 for controlling the decoding unit 20, and performs a decoding process on the encoded information D2 successively inputted through the transmission line, through the decoding unit 20 controlled by the decoding control unit 71, to thereby create restored image information D3, and then successively outputs the restored image information D3 to a display unit (not shown) for successive reproduction.

(2) Construction of Decoding Control Unit 71

Actually, the decoding control unit 71 of this decoding unit 53 temporarily stores successively inputted encoded information D2 in a storage buffer 121 (FIG. 9) of the decoding unit 20, detects conditions on decoding (hereinafter referred to as decoding conditions), such as a decoding order of the encoded information D2 and a start time of a decoding process, based on the headers of the encoded information D2, and thus can control the decoding unit 20 on the decoding conditions.

In addition to the above structure, the decoding control unit 71 watches a storage state of the restored image information D3 stored in an image rearrangement buffer 126 (FIG. 9) after the decoding process, and when detecting underflow as the storage state, carries out a re-output control process for re-outputting the restored image information D3 outputted just before the detection (underflow). This re-output control process will be described by using an example shown in FIG. 6.

In this FIG. 6, as in the case of FIG. 3, a column "EI" shows a picture-type order before an encoding process, a column "EO" shows a picture-type order after the encoding process, a column "DO" shows a picture-type order after decoding, a column "Ed" shows encode delays, and a column "Dd" shows decode delays. In addition, as in the case of FIG. 3, in this FIG. 6, a transmission time through the transmission line between the encoding apparatus 52 and the decoding apparatus 53 is not considered and an input time of encoded information D2 to the decoding apparatus 53 is taken to the same as an output time (in the column "EO") of the encoded information D2 from the encoding unit 10.

In addition, a column "Sud (Start-up delay)" shows a period of time after each piece of encoded information D2 is inputted until a decoding process is started (hereinafter, this period of time is referred to as a start-up delay), and this start-up delay is calculated based on the encoding conditions by the encoding control unit 61 of the encoding apparatus 52 and is added as a header.

When the decoding control unit 71 receives the first encoded information D2a ("I00" in the column "EO"), it ignores the start-up delay for the encoded information D2a ("6" [seconds] in the column "Sud") and performs control to immediately send the encoded information D2a to the reverse encoding unit 122 and start a decoding process ("0" [second] in the column "Dd"). As a result, the decoding control unit 71 can shorten a preparation time (driving time) for continuous reproduction.

In this case, the decoding control unit 71 has a lag between the actual start time of the decoding process and the original start time, due to the control (this lag has to be adjusted and specifically, is 6 [seconds] in FIG. 6 and is hereinafter referred to as a delay amount to be adjusted), so that restored image information D3a which is a result of decoding the encoded information D2a is outputted via the image rearrangement buffer 126 and then re-outputted (at an item "t=8" in the column "DO") so as to offset a part of the delay amount to be adjusted (which corresponds to "2" [seconds] of "t=8" in the column "Dd").

Then, the decoding control unit 71 have encoded information D2b, D2c, . . . successively inputted following the encoded information D2a ("P01", "P02", . . . in the column "EO"), decoded according to the start-up delays, and manages the storage state of the restored image information D3b, D3c, . . . ("P01", "P02", . . . in the column "DO") being stored in the image rearrangement buffer 126 (FIG. 9) after the decoding process.

Under this state, every time when restored the image information D3 to be stored in the image rearrangement buffer 126 is failed (underflow), the decoding control unit 71 re-outputs the restored image information D3 outputted just before the failure ("P05" and "P10" in the column "DO"), to thereby periodically offset the other delay amounts to be adjusted.

In such a manner, the decoding control unit 71 executes the re-output control process, so as to keep the output continuousness of the restored image information D3.

Figure 7:
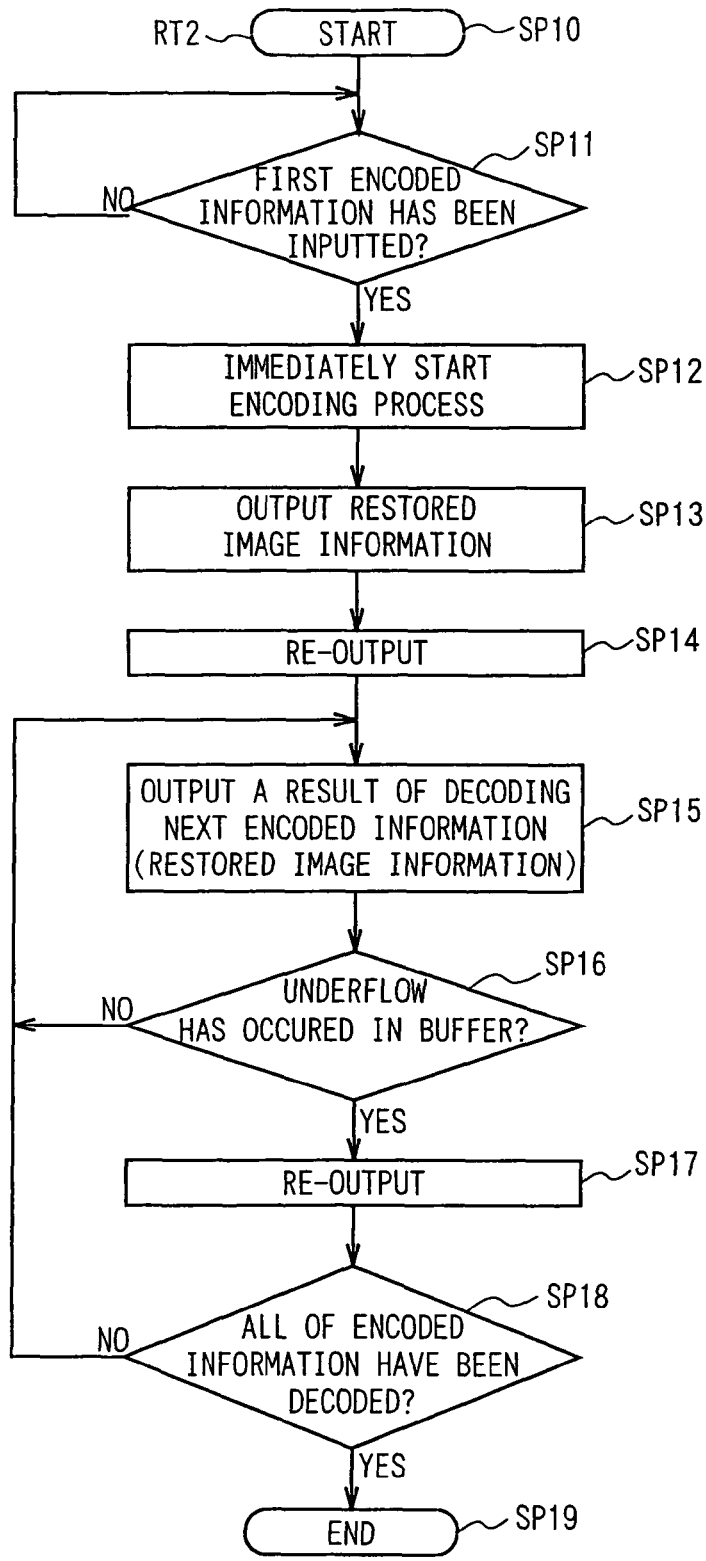
FIG. 7 is a flowchart showing a procedure for a re-output control process.

Now, the output timing notification process described above is sequentially executed following a procedure RT2 for the re-output control process shown in FIG. 7.

That is, when predetermined operations to execute a decoding process are performed with an input unit (not shown) for example, the decoding control unit 71 starts the procedure RT2 for the re-output control process from step SP10, and waits for the first encoded information D2a to be inputted at next step SP11, and when receiving the encoded information D2a, moves on to step SP12.

Then, the decoding control unit 71 ignores a start-up delay for the encoded information D2a and immediately starts the decoding process at step SP12, and after outputting restored image information D3a obtained as a result of the decoding process at next step SP13, re-outputs the restored image information D3a at step SP14 to offset a part of a delay amount to be adjusted.

Next, the decoding control unit 71 starts decoding of following restored image information D2 (D2b, D2c, . . . D2n) and outputs restored image information D3 (D3b, D3c, . . . D3n) obtained by the process at step SP15, and at next step SP16 judges whether restored image information D3 to be stored in the image rearrangement buffer 126 (FIG. 9) has been failed, and then if a negative result is obtained, returns back to step SP15 and repeats the above processes.

If an affirmative result is obtained, on the contrary, the decoding control unit 71 re-outputs the restored image information D3 ("P05" and "P10" in the column "DO") outputted at step SP15 to offset a part (or all) of the remaining delay amount to be adjusted and moves on to next step SP18.

Then, the decoding control unit 71 judges at step SP18 whether all of the delay amount to be adjusted is offset, and if a negative result is obtained, returns back to step SP15 and repeats the above processes. And if an affirmative result is obtained, on the contrary, the decoding control unit 71 moves on to step SP19 where this procedure RT2 for the re-output control process is terminated.

In such a manner, the encoding control unit 11 can carries out the re-output control process following the procedure RT2 for the re-output control process.

According to the above construction, this decoding apparatus 53 temporarily stores the restored image information D3 successively created by performing the decoding process on the encoded information D2 which have been encoded with the JVT encoding system, in the image rearrangement buffer 126 (FIG. 9), and if restored image information D3 to be stored in the image rearrangement buffer 126 (FIG. 9) is failed, re-outputs the restored image information D3 outputted just before the failure.

Therefore, the decoding apparatus 53 can keep the output continuousness of the restored image information D3 even the encoded information D2 have been subjected to encoding with the JVT encoding system which does not allow a decoding order to be naturally determined.

In this case, the decoding apparatus 53 ignores the decoding start time (start-up delay) set for the first encoded information D2 stored in the storage buffer 121 (FIG. 9) and immediately starts decoding of the encoded information D2a, and when restored image information D3 to be stored in the image rearrangement buffer 126 (FIG. 9) is failed, offsets a lag (delay amount to be adjusted) from the set decoding start time occurred due to the ignorance, by re-outputting the restored image information outputted just before the failure.

As a result, the decoding apparatus 53 can shorten a preparation time (driving time) for continuous reproduction and can keep the output continuousness of restored image information while periodically dispersing a lag occurred due to the shortening (delay amount to be adjusted).

According to the aforementioned construction, the restored image information D3 sequentially created by performing the decoding process on the encoded information D2 which have been subjected to encoding with the JVT encoding system are temporarily stored in the image rearrangement buffer 126 (FIG. 9), and when restored image information D3 to be stored in the image rearrangement buffer 126 (FIG. 9) is failed, the restored image information D3 outputted just before the failure is re-outputted, so that even the encoded information D2 have been subjected to encoding with the JVT encoding system which does not allow a decoding order to be naturally determined, the output continuousness of the restored image information D3 can be kept, which results in the continuous reproduction.

(3) Other Embodiment

Note that, the aforementioned second embodiment has described the case where the JVT encoding system is applied. This invention, however, is not limited to this and another kind of encoding system which can treat at least B-pictures as pictures to be prediction-encoded can be applied.

Further, the aforementioned second embodiment independently uses the storage buffer 121 and the rearrangement buffer 126 as storage means for temporarily storing encoded information and restored image information sequentially created by performing a decoding process on the encoded information. This invention, however, is not limited to this and the storage buffer 121 and the rearrangement buffer 126 are used in common. In this case, the number of buffers and manner of storage can be changed according to necessity.

Still further, the aforementioned second embodiment has described the case where the decoding control unit 71 serving as an output control means ignores a decoding start time (start-up delay) set for the first encoded information D2a being stored in the storage buffer 121 (FIG. 9) and immediately starts decoding of the encoded information D2a, and when restored image information D3 to be stored in the image rearrangement buffer 126 (FIG. 9) is failed, offsets a lag (a delay amount to be adjusted) from the set decoding start time occurred due to the ignorance, by re-outputting restored image information outputted just before the failure. In addition to this, if a storing order (in the column "EO") of any of the encoded information D2a to D2b stored in the storage buffer 121 is different from an order before encoding (in the column "EI") (for example, in the item "t=32" in FIG. 6), the restored image information D3 corresponding to the encoded information D2 having the different order may be re-outputted. By doing so, a decode delay which becomes longer when a different order is generated can be filled by re-output, which results in more assured output continuousness of the restored image information D3.

Industrial Applicability

This invention can be used for a case of transmitting successive image information via a network medium such as satellite broadcasting, cable TV or the Internet, or a case of processing the successive image information on a storage medium such as an optical disc, magnetic disk or flash memory.

DESCRIPTION OF REFERENCE NUMERALS 1,51 . . . IMAGE REPRODUCTION SYSTEM, 2,52 . . . ENCODING APPARATUS, 3,53 . . . DECODING APPARATUS, 10 . . . ENCODING UNIT, 11,61 . . . ENCODING CONTROL UNIT 11a . . . DELAY CALCULATION UNIT, 11b . . . HEADER ADDITION UNIT, 20 . . . DECODING UNIT, 21,71 . . . DECODING CONTROL UNIT

The invention claimed is:

1. A decoding apparatus for executing a decoding process on a plurality of encoded information encoded with an encoding system capable of treating at least B-pictures as pictures for inter-prediction-encoding, said decoding apparatus comprising:

storage means for temporarily storing restored image information sequentially created by the decoding process and for temporarily storing the encoded information, the encoded information including a picture encoding type; and output control means for controlling output of the restored image information stored in said storage means, wherein said output control means, when restored image information fails to be stored in said storage means, re-outputs restored image information outputted just before the failure and ignores a decoding start time set for a first encoded information of a plurality of encoded information stored in said storage means, to start decoding the first encoded information of a plurality of encoded information prior to the decoding start time of the first encoded information.

2. The decoding apparatus according to claim 1, wherein: when a failure occurs, said output control means offsets a lag from the decoding start time that occurred due to ignoring the decoding start time, by re-outputting restored image information outputted just before the failure.

3. A decoding method, implemented on a decoding apparatus, for executing a decoding process on a plurality of encoded information encoded with an encoding system capable of at least B-pictures as pictures for inter-prediction-encoding, said decoding method comprising:

temporarily storing each of the encoded information before the decoding, the encoded information including a picture encoding type;

temporarily storing restored image information successively created by the decoding process;

outputting the restored image information to be stored;

ignoring a decoding start time for a first encoded information of the plurality of encoded information;

starting decoding of the first encoded information of the plurality of first encoded information prior to the decoding start time of the first encoded information; and when restored image information fails to be stored in said storing, re-outputting restored image information outputted just before the failure.

4. The decoding apparatus according to claim 3, wherein, when the failure occurs, offsetting a lag from the decoding start time that occurred due to ignoring the decoding start time by re-outputting restored image information outputted just before the failure.

5. A decoding apparatus to execute a process on a plurality of encoded information encoded with an encoding system capable of treating at least B-pictures as pictures for inter-prediction-encoding, said decoding apparatus comprising:

a storage unit that temporarily stores restored image information sequentially created by the decoding process and temporarily stores the encoded information, the encoded information including a picture encoding type; and an output control unit that controls output of the restored image information stored in said storage unit, said output control unit, when restored image information fails to be stored in said storage unit, re-outputs restored image information outputted just before the failure and said output control unit ignores a decoding start time set for a first encoded information of a plurality of encoded information stored in said storage unit, to start decoding the first encoded information of a plurality of encoded information prior to the decoding start time of the first encoded information.

6. The decoding apparatus according to claim 1, wherein said output control means, when a storing order of encoded information being stored in said storage means is different from an order before the encoding, re-outputs restored image information corresponding to the encoded information having a different order.

7. The decoding method according to claim 3, further comprising:

judging whether a storing order of each piece of the encoded information stored is different from an order before the encoding process; and when a judgment result indicative of a difference is obtained by said judging, re-outputting restored image information corresponding to encoded information having a different order.

8. The decoding apparatus according to claim 5, wherein said output control unit, when a storing order of encoded information being stored in said storage unit is different from an order before the encoding, re-outputs restored image information corresponding to the encoded information having a different order.

* * * * *